United States Patent [19]

Clemes

[11] Patent Number: 5,106,596
[45] Date of Patent: Apr. 21, 1992

[54] LAMINATED SULPHUR DIOXIDE GENERATORS

[76] Inventor: Dennis C. Clemes, P.O. Box 239, Cape Town, South Africa, 7725

[21] Appl. No.: 374,364

[22] Filed: Jun. 30, 1989

[30] Foreign Application Priority Data

Jul. 4, 1988 [ZA] South Africa .................. 88/4772
Jan. 27, 1989 [ZA] South Africa .................. 89/0691

[51] Int. Cl.$^5$ ............................................. B01J 7/00
[52] U.S. Cl. ............................ 422/305; 239/55; 239/60
[58] Field of Search .............. 422/305, 40, 9, 123, 422/29, 32; 239/54, 55, 56, 60

[56] References Cited

U.S. PATENT DOCUMENTS

| | | | |
|---|---|---|---|
| 2,898,026 | 8/1959 | Aid | 229/14 |
| 3,996,007 | 12/1976 | Fang et al. | 23/253 TD |
| 4,331,693 | 5/1982 | Wojciechowski | 426/419 |
| 4,384,972 | 5/1983 | Nakamura et al. | 252/188.21 |
| 4,411,918 | 10/1983 | Cimino et al. | 426/124 |
| 4,490,330 | 12/1984 | Howes et al. | 422/29 |
| 4,550,026 | 10/1985 | Ando | 422/29 |
| 4,882,874 | 7/1988 | Paulson et al. | 47/1.5 |

FOREIGN PATENT DOCUMENTS

| | | |
|---|---|---|
| 2849230 | 8/1930 | Australia . |
| 2313870 | 1/1977 | France . |
| 2467795 | 4/1981 | France . |
| 2590798 | 6/1987 | France . |

OTHER PUBLICATIONS

Chem. Abstract 96(3): 18868f [in English], Illouze, "Packing for Preservation . . . ," Apr. 1981.

*Primary Examiner*—David L. Lacey
*Assistant Examiner*—Janelle D. Waack
*Attorney, Agent, or Firm*—Kenyon & Kenyon

[57] ABSTRACT

A sulphur dioxide generator is disclosed which comprises two sheets of synthetic or other material which are laminated together by a laminating substance. Dispersed in the laminating substance is a material which, in the presence of moisture, generates sulphur dioxide. The sheets are pervious to water vapor and sulphur dioxide and can be of natural, synthetic or semi-synthetic sheet material. Suitable sheet materials are polyester, polypropylene, polyethylene, cellulose, paper, cellulose acetate or regenerated cellulose foil.

10 Claims, 1 Drawing Sheet

LAMINATED SULPHUR DIOXIDE GENERATORS

FIELD OF THE INVENTION

This Invention relates to sulphur dioxide generators.

BACKGROUND TO THE INVENTION

Sulphur dioxide generators are placed in cartons containing table grapes, the gaseous sulphur dioxide in the carton preventing the growth on the grapes of certain forms of fungi. Where the grapes are to be shipped over long distances it is conventional to use two stage generators. These generate sulphur dioxide relatively rapidly when first placed in the carton. The fast rate of release lasts for a few days and thereafter sulphur dioxide is released at a much slower rate over a period of several weeks. In the most commonly used two stage generator, a paper substrate is coated with a layer comprising a binder in which sodium metabisulphate is dispersed. Sodium metabisulphate, in the presence of moisture, releases sulphur dioxide. Sulphur dioxide from said layer constitutes the first stage release. The generator is further formed with closed pockets in which granular metabisulphate is contained. Water vapour only penetrates the material which forms the pockets after a few days, whereupon the slow, long term second stage release commences.

Much research work has been done to determine the optimum concentration of sulphur dioxide in the atmosphere of the carton. This research work has not yet produced results that have been accepted by the industry as conclusive but it does appear as if much lower sulphur dioxide concentrations than were previously considered desirable are adequate to prevent fungi growth on the grapes. This also tends to lower the sulphite level in the grapes and to reduce any sulphur dioxide related damage.

The present invention seeks to provide a simple, inexpensive sulphur dioxide generator which will maintain an acceptable sulphur dioxide concentration in a carton for a period of weeks during shipping or for months if the grapes are stored for later out-of-season sale.

BRIEF DESCRIPTION OF THE INVENTION

According to one aspect of the present invention there is provided a laminated sulphur dioxide generator which comprises two sheets of gas permeable material with a laminating substance between them, the laminating substance having a material dispersed therein which, in the presence of moisture, releases sulphur dioxide.

The laminating substance can be a wax, such as a paraffin wax, a microcrystalline wax or a laminating adhesive.

The sheets can be of paper, synthetic plastics material, regenerated cellulose foil, cellulose or cellulose acetate. Polyester, polypropylene and polyethylene are suitable synthetic plastics materials.

The sheets can both be transparent, can both be pigmented, or one can be pigmented and the other transparent.

More than two sheets can be provided if desired and more than one layer of said substance.

Both sheets, or one of the sheets, can be printed.

According to a further aspect of the present invention there is provided a method of manufacturing a sulphur dioxide generator which comprises laminating two sheets of gas permeable material using a laminating substance which has dispersed in it a material which, in the presence of moisture, releases sulphur dioxide.

The substance can be applied by a gravure roll, a coating head or an extruder to one of the sheets and the sheets thereafter pressed into face-to-face contact. Alternatively, the sheets can be fed in web form to the nip between two rollers and the substance can be fed in between the webs, the spacing between the rollers determining the thickness of the layer of laminating substance.

One sheet can be coated with the substance and the other sheet can be smaller in size than said one sheet so that an area of said substance is exposed. Additionally, or alternatively, the other sheet can have holes in it which expose areas of the substance.

BRIEF DESCRIPTION OF THE DRAWINGS

For a better understanding of the present invention, and to show how the same may be carried into effect, reference will now be made, by way of example, to the accompanying drawing in which.

DETAILED DESCRIPTION OF THE DRAWINGS

Figure 1:
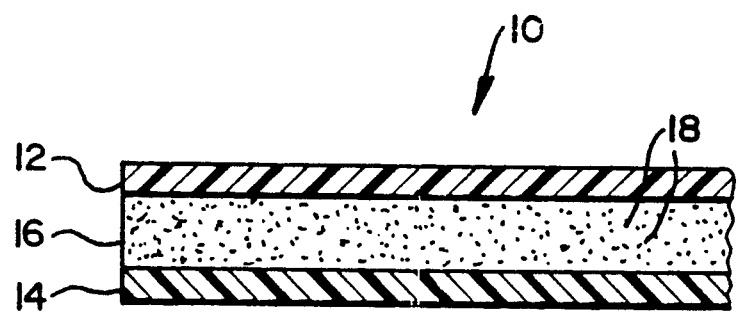
FIG. 1 is a section through part of a sulphur dioxide generator.

The sulphur dioxide generator shown in FIG. 1 is generally designated 10 and comprises two sheets of synthetic plastics material which have been designated 12 and 14. The sheets are secured together by a laminating substance which has been designated 16. Dispersed in the substance 16 is a material 18 which, in the presence of moisture, releases sulphur dioxide. This can be sodium metabisulphate, an acidic mixture comprising sodium sulphite and fumaric acid, an acidic mixture comprising sodium sulphite and potassium bitartrate or a mixture of both these acidic mixtures.

The sheets 12 and 14 can be of any synthetic plastics material which is gas and water vapour pervious. The synthetic plastics material must be capable of allowing water vapour to penetrate it to reach the material 18 and permit sulphur dioxide to pass through it to atmosphere. Preferred materials are polyester, polypropylene and polyethylene.

The sulphur dioxide generator is preferably rectangular in plan. It will be understood that, around the periphery of the generator, water vapour can reach the exposed edges of the substance 16 (see the left hand edge of the generator of FIG. 1) without permeating one of the sheets.

The generator of FIG. 1 is used by placing it in a carton which contains grapes. The atmosphere in such a carton is moist and water vapour consequently penetrates the sheets 12 and 14 and reaches the material 18. The reaction between the material 18 which is dispersed in the laminating substance 16 and the water vapour causes sulphur dioxide to be generated. This permeates through the sheets 12 and 14 into the atmosphere of the carton and prevents the development of certain fungi on the grapes. The rate of production of sulphur dioxide is substantially constant over the life of the generator. The rate at which sulphur dioxide is generated is proportional to the area of the generator, temperature, and the thickness of the sheets 12 and 14. Of course, a polyester sheet has a different permeation rate to a polypropylene or polyethylene sheet of the same thickness.

Figure 2:
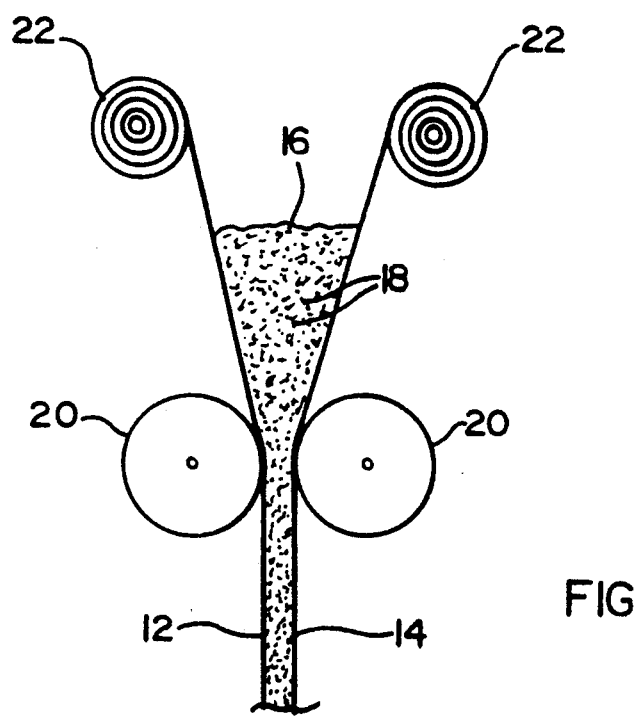
FIG. 2 illustrates one method of producing the sulphur dioxide generator of FIG. 1.

Referring now to FIG. 2, reference numerals 20 designate two heated rollers and reference numerals 22 two rolls of synthetic plastics material in web form. The webs are fed through the nip between the rollers 20 and the laminating substance is between the two webs. The width of the nip between the rollers 20 determines what thickness of laminating substance can pass between the rollers 20 with the synthetic plastics material.

After lamination has taken place the laminate can be needle punched, if this is required, and then cut into generators of the desired size.

The sheets 12 and 14 can both be transparent, can both be pigmented so that they are opaque, or one can be pigmented and the other transparent. One or both sheets can have printing thereon.

An alternative method of production comprises feeding one of the webs of synthetic plastics material over a gravure roll and using the roll to apply to one surface of the web a layer of laminating substance of the requisite thickness. The other web is then brought into contact with the layer of laminating substance and passed between two rollers to press the two webs together with the laminating substance between them.

In another method the apparatus used to apply hot melt adhesive to labels is employed to apply the laminating substance. Such apparatus includes a coating head including a slit through which the laminating substance is forced as a thin stream.

The laminating substance can be a wax, such as a paraffin wax, with said material dispersed in it. Alternatively, commercially available laminating adhesive can have said material dispersed in it prior to being applied to said sheets.

Figure 3:
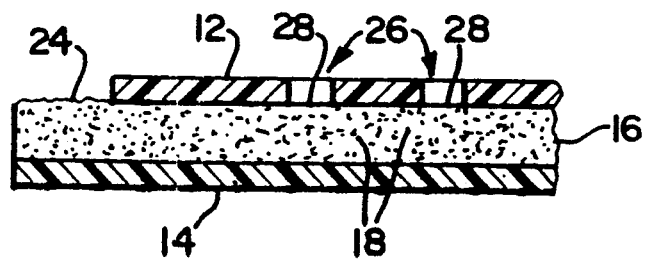
FIG. 3 illustrates a modified form of generator.

If a faster initial release rate is required, then an area of the substance 16 can be exposed to the atmosphere within the carton. FIG. 3 illustrates two ways in which this can be achieved. In FIG. 3 the sheet 12 has its edge set back from the edge of the sheet 14 onto which the substance 16 has been coated. Thus around all or part of the periphery of the sheet 12 there is an exposed area 24 of the substance 16. Initial release of sulphur dioxide takes place from the area. In addition, the sheet 12 is punched to provide holes 26. The substance 16 is thus exposed in the areas 28. These two constructions can, if desired, be used in the same generator or can be used separately.

Polyester is suitable as it does not crinkle or distort when said laminating substance is applied hot. If said substance is applied cold then polypropylene or polyethylene can be used. For example, if a contact adhesive is used as the laminating substance, and this is applied cold, then cheaper polyethylene can be used.

If desired a humectant such as glycerol or sorbitol or a deliquescent or hygroscopic salt such as calcium chloride can be mixed in the laminating substance to "attract" water through the sheets to the laminating substance and thereby enhance the rate of generation of sulphur dioxide.

In addition to the synthetic plastics materials mentioned above, other synthetic, semi-synthetic or natural materials can be used. For example, paper, cellulose, cellulose acetate and regenerated cellulose foil can be laminated to form a generator.

I claim:

1. A sulphur dioxide generator comprising
   a pair of sheets of gas permeable material;
   a layer of laminating substance between and securing said sheets together in laminated manner; and
   a material dispersed in said layer of laminating substance for generating sulphur dioxide in the presence of moisture.

2. A sulphur dioxide generator according to claim 1, in which said laminating substance is a wax.

3. A sulphur dioxide generator according to claim 2, in which said wax is a microcrystalline wax.

4. A sulphur dioxide generator according to claim 1, in which said substance is a laminating adhesive.

5. A sulphur dioxide generator according to claim 1, in which said sheets are of plastics material.

6. A sulphur dioxide generator according to claim 1, in which one of said sheets is larger in area than the other and said substance is coated onto the larger area sheet whereby part of the area of said substance protrudes beyond the smaller area sheet and is exposed to the atmosphere.

7. A sulphur dioxide generator as set forth in claim 1 wherein each said sheet is selected from the group consisting of polyester, polypropylene and polyethylene.

8. A sulphur dioxide generator as set forth in claim 1 wherein each sheet is selected from the group consisting of paper, regenerated cellulose foil, cellulose and cellulose acetate.

9. A sulphur dioxide generator as set forth in claim 1 wherein one of said sheets has holes therein for exposing said laminating substance to the atmosphere.

10. A sulphur dioxide generator as set forth in claim 1 which further comprises a humectant in said substance for attracting water through said sheets.

* * * * *